United States Patent
Durham et al.

(10) Patent No.: US 9,912,775 B2
(45) Date of Patent: Mar. 6, 2018

(54) METHOD AND APPARATUS FOR COMMUNICATING BETWEEN COMPANION DEVICES

(71) Applicant: Intel Corporation, Santa Clara, CA (US)

(72) Inventors: Lenitra M. Durham, Beaverton, OR (US); Giuseppe Raffa, Portland, OR (US); Glen J. Anderson, Beaverton, OR (US); Philip A. Muse, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 14/367,964

(22) PCT Filed: Dec. 19, 2013

(86) PCT No.: PCT/US2013/076577
§ 371 (c)(1),
(2) Date: Jun. 23, 2014

(87) PCT Pub. No.: WO2015/094288
PCT Pub. Date: Jun. 25, 2015

(65) Prior Publication Data
US 2016/0036933 A1    Feb. 4, 2016

(51) Int. Cl.
*H04B 7/15*    (2006.01)
*H04L 29/08*    (2006.01)
(Continued)

(52) U.S. Cl.
CPC ......... *H04L 67/2828* (2013.01); *H04W 4/008* (2013.01); *H04W 4/12* (2013.01); *H04W 88/04* (2013.01)

(58) Field of Classification Search
CPC .. H04B 7/24; H04B 7/00; H04B 1/38; H04M 1/00; G06F 3/0481; G06F 17/30876;
(Continued)

(56) References Cited

U.S. PATENT DOCUMENTS 7,073,129 B1 *  7/2006  Robarts ................. G06Q 10/10
                                                  463/36
7,558,529 B2 *  7/2009  Seshadri ............. H04M 1/6033
                                                  455/41.2

(Continued)

FOREIGN PATENT DOCUMENTS

CN      105874443 A     8/2016
EP       2720442 A1     4/2014
(Continued)

OTHER PUBLICATIONS

"International Application Serial No. PCT/US2013/076577, International Preliminary Report on Patentability dated Jun. 30, 2016", 10 pgs.

(Continued)

*Primary Examiner* — Md Talukder
(74) *Attorney, Agent, or Firm* — Schwegman Lundberg & Woessner, P.A.

(57) ABSTRACT

Various systems and methods for transmitting a message to a secondary computing device are described herein. An apparatus comprises a context processing module, a context-aware message mode module, and a message retrieval module. The context processing module retrieves a context of a user of a primary computing device. The context-aware message mode module identifies a message mode for communicating with a secondary computing device of the user based on the context. A message retrieval receives a communication message at the primary computing device, determines that the communication message is to be transmitted to the secondary computing device of the user based on the (Continued)

message mode, and based on the determining, translates the communication message into a translated message according to the message mode and transmits the translated message to the secondary computing device from the primary computing device.

22 Claims, 4 Drawing Sheets

(51) Int. Cl.
*H04W 4/00* (2018.01)
*H04W 4/12* (2009.01)
*H04W 88/04* (2009.01)

(58) Field of Classification Search
CPC ......... G06F 17/30899; G06F 17/30861; G06F 17/30867; H04L 67/42
USPC ........ 455/41.1, 41.2, 41.3, 556.2, 557, 66.1, 455/4.2, 11.1
See application file for complete search history.

(56) References Cited

U.S. PATENT DOCUMENTS

| | | | |
|---|---|---|---|
| 2004/0242266 A1* | 12/2004 | Tagliabue | H04L 51/38 455/556.1 |
| 2005/0272408 A1 | 12/2005 | Wilkes-Gibbs et al. | |
| 2007/0298743 A1* | 12/2007 | Chung | H04B 5/0062 455/187.1 |
| 2008/0207265 A1* | 8/2008 | Chung | H04W 84/18 455/557 |
| 2009/0010458 A1* | 1/2009 | Chung | H04R 3/005 381/122 |
| 2009/0023388 A1* | 1/2009 | Chung | H04R 1/00 455/41.2 |
| 2009/0117881 A1 | 5/2009 | Deshpande | |
| 2009/0276480 A1* | 11/2009 | Anna | H04L 69/08 709/201 |
| 2010/0299132 A1* | 11/2010 | Dolan | G06F 17/2818 704/2 |
| 2010/0303014 A1* | 12/2010 | McMullin | H04W 84/18 370/328 |
| 2011/0014933 A1* | 1/2011 | Karmarkar | H04M 1/72547 455/466 |
| 2011/0231499 A1* | 9/2011 | Stovicek | H04M 1/72547 709/206 |
| 2011/0286600 A1* | 11/2011 | Gosior | A63F 13/12 381/2 |
| 2012/0001875 A1* | 1/2012 | Li | G01S 7/5273 345/177 |
| 2012/0158472 A1* | 6/2012 | Singh | G06F 17/30241 705/14.4 |
| 2012/0171963 A1* | 7/2012 | Tsfaty | H04B 11/00 455/41.3 |
| 2012/0254374 A1* | 10/2012 | Wheeler | H04L 61/1541 709/220 |
| 2013/0095865 A1 | 4/2013 | Roets | |
| 2013/0227411 A1* | 8/2013 | Das | H04M 3/42042 715/702 |
| 2013/0316746 A1 | 11/2013 | Miller et al. | |
| 2013/0325971 A1* | 12/2013 | Winer | G06Q 10/1091 709/206 |
| 2014/0154986 A1* | 6/2014 | Lee | H04B 7/26 455/41.2 |
| 2014/0192622 A1* | 7/2014 | Rowe | G01S 5/18 367/117 |
| 2014/0340366 A1* | 11/2014 | Poulsen | G06F 3/043 345/177 |
| 2015/0072658 A1* | 3/2015 | Panttaja | H04W 4/12 455/412.2 |
| 2015/0119067 A1* | 4/2015 | Lavery | H04W 64/003 455/456.1 |
| 2015/0207560 A1* | 7/2015 | Chung | H04B 11/00 455/66.1 |
| 2016/0036933 A1* | 2/2016 | Durham | H04L 67/2828 455/11.1 |

FOREIGN PATENT DOCUMENTS

| | | |
|---|---|---|
| WO | WO-2003062984 A2 | 7/2003 |
| WO | WO-2012172970 A1 | 12/2012 |
| WO | WO-2015094288 A1 | 6/2015 |

OTHER PUBLICATIONS

"International Application Serial No. PCT/US2013/076577, International Search Report dated Sep. 18, 2014", 5 pgs.
"International Application Serial No. PCT/US2013/076577, Written Opinion dated Sep. 18, 2014", 8 pgs.
"European Application No. 13899426.4, Extended European Search Report dated Jun. 30, 2017", w/ English Translation, 7 pgs.

* cited by examiner

METHOD AND APPARATUS FOR COMMUNICATING BETWEEN COMPANION DEVICES

This application is a National Stage Application under 35 U.S.C 371 from International Application No. PCT/US2013/076577 filed on Dec. 19, 2013, which is hereby incorporated by reference in its entirety.

BACKGROUND

People increasingly have the opportunity to have more than one electronic device with them at a given time. For example, a person may have a mobile phone and a wearable-device, such as a wrist-based device. In some instances, communication is possible between the two electronic devices. For example, a notification message may be received at the mobile device and retransmitted from the mobile device to the wrist-based device.

BRIEF DESCRIPTION OF DRAWINGS

Some embodiments are illustrated by way of example and not limitation in the figures of the accompanying drawings in which.

DETAILED DESCRIPTION

A user of a primary computing device (e.g., a mobile phone) may have a secondary computing device (e.g., a companion device such as a wrist-based device or other wearable device) that may be used to display or relay communications received at the primary computing device. In various examples, the secondary computing device has limited display and communication capabilities as compared with the primary computing device. Accordingly, when using both primary and secondary computing devices it may be desirable to restrict the amount and content of information relayed from the primary computing device to the secondary computing device for consumption by a user. For example, a message received at a primary computing device may be modified before being displayed on a secondary computing device to only show relevant information. In some examples, the message is not relayed.

Figure 1:
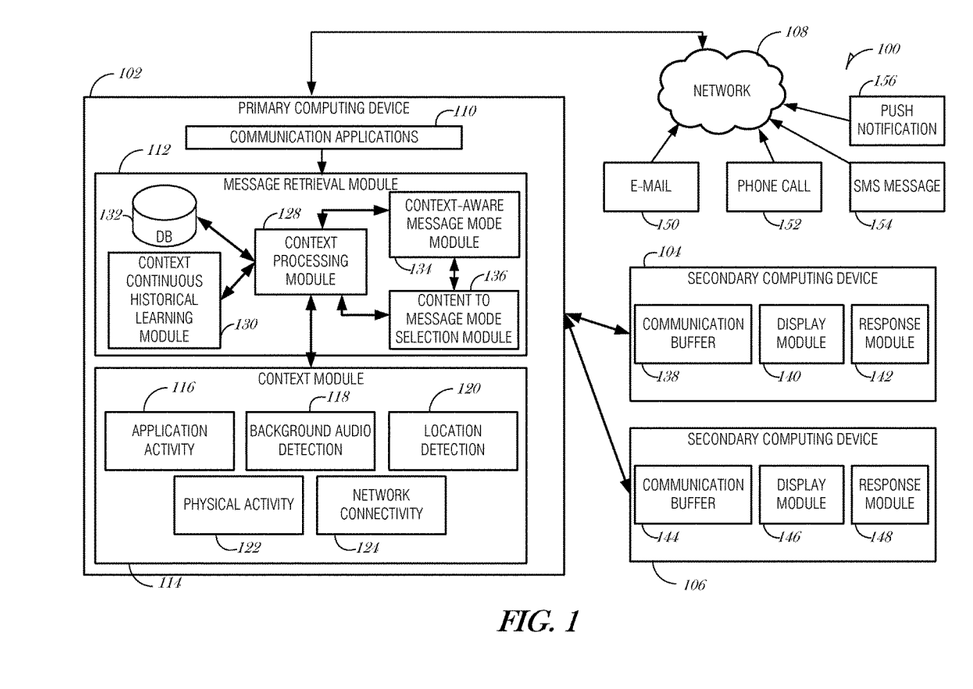
FIG. 1 is a schematic diagram illustrating communication between multiple devices, according to example embodiment.

FIG. 1 is a schematic diagram 100 illustrating communication between multiple devices. In various examples, the components illustrated in FIG. 1 may be used to restrict the amount and type of content transmitted to one or more secondary computing devices (104, 106) from a primary computing device (102). While functionality of the depicted devices is described with respect to particular modules, functionality may be performed by other modules or combined with other modules. Similarly, the labels of the modules are for illustration purposes and other labels may be used.

In various examples, a primary computer device 102 is a communication device of the user. Throughout this document the primary computing device 102 will generally be referred to as a mobile phone, however, the primary computing device 102 may be other computing devices such as a tablet-based computing device or laptop. In various examples, the primary computer device 102 may have one or more antennas/transceivers configured to communicate over cellular networks (e.g., GMS, UMTS, 4G LTE, etc.) or other networks (e.g., 802.11, Bluetooth® radio, near-field communication (NFC), etc.). The primary computing device 102 may include a storage device and at least one processor (e.g., single core, multicore, multiple processor), wherein the processor is configured to execute instructions stored on the storage device to perform functionality described herein.

The primary computing device 102 may also include one or sensors used to infer what the user is doing, where the user is located or other contextual elements, which are discussed in more detail with respect to a context module 114. Sensors may include an accelerometer, barometer, gyroscope, GPS, light sensor, proximity sensor, magnetometer etc.

In various examples, the primary computing device 102 receives communications such as e-mails (150), phone calls (152), short message service (SMS) messages (154), push notifications (156) from apps (e.g., social media messages, sports updates) installed on the primary computing device 102 over the network 108 via the communication applications 110. The network 108 may include local-area networks (LAN), wide-area networks (WAN), wireless networks (e.g., 802.11 or cellular network), the Public Switched Telephone Network (PSTN) network, ad hoc networks, personal area networks (e.g., Bluetooth®) or other combinations or permutations of network protocols and network types. The network 108 may include a single local area network (LAN) or wide-area network (WAN), or combinations of LAN's or WAN's, such as the Internet. The various devices coupled to the network 108 may be coupled via one or more wired or wireless connections.

In various examples, the secondary computing devices 104, 106 are wearable devices such as a wrist-based or head-mounted (e.g., glasses) computing devices. In various examples, the secondary computing devices 104, 106 are not wearable but act as secondary devices for a user. The secondary computing devices 104, 106 may have more limited capabilities as compared to the primary computing device 102. For example, the secondary computing devices 104, 106 may have a smaller display size than the primary computing device 102 (e.g., 1.5" vs. 4.5"). Similarly, the secondary computing devices 104, 106 may have more limited connectivity options. For example, the secondary computing devices 104, 106 may not have cellular or Wi-Fi™ capabilities, but instead communicates via short-range communication methods such as a Bluetooth® network or NFC.

As with the primary computing device 102, the secondary computing devices 104, 106 may include one or more sensors, a storage device, and at least one processor (e.g., single core, multicore, multiple processor), wherein the processor is configured to execute instructions stored on the storage device to perform functionality described herein.

In various examples, the context module 114 accesses sensor data, application interactions, and communications received at the primary computing device 102 to infer a context of a user. A context(s) of a user may indicate a state of the user and may be used to determine whether a communication received at the primary computing device 102 should be forwarded to a secondary computing device. For example, a context may be a combination of factors based on, but not limited to, application activity 116, background audio detection 118, location detection 120, physical activity 122, network connectivity 124, and event activity.

In various examples, the application activity 116 may include examining application data to determine what the user is doing. For example, the context module 114 may determine that a user is playing a game on the primary computing device 102, and thus may infer that the user may want notifications to be displayed on a secondary computing device 104, 106 instead of the primary computing device 102. Another example may be determining that the user is currently running a navigation application, which may indicate a context in which the user may is not able to respond to SMS messages 154. In yet another example, the context module 114 may access a calendar application on the primary computing device 102 and determine that the user is currently scheduled for a meeting and where the meeting is taking place.

In various examples, the application activity 116 may include monitoring communications made by a user of the primary computing device 102. For example, the application activity 116 may log who a user makes a call to and who calls the user. Additionally, the application activity 116 may log when the user makes and receives calls. In an example, the application activity 116 also monitors what audio state the primary computer computing device is currently in (e.g., silent, vibrate). In various examples, the application activity 116 monitors communications made using social media applications installed on the primary computing device 102.

In various examples, the background audio detection 118 may use voice recognition to determine whether or not a user of the phone is currently speaking.

In various examples, the location detection 120 may use GPS data, Wi-Fi SSIDs, Bluetooth® signals, etc., to determine a location of the primary computing device 102, whether or not the primary computing device 102 is moving, and what speed the primary computing device 102 is moving.

In various examples, the physical activity 122 may be used to infer movement of the user. For example, data from the various sensors of the primary computing device 102 may be accessed and compared to movement profiles to determine if the user is running, walking, etc.

In various examples, the network connectivity 124 may examine available networks to the primary computing device 102. For example, the network connectivity 124 may indicate that there is no longer a cellular connection, but that a Wi-Fi connection is still available. Thus, when a message is forwarded from the primary computing device 102 to the secondary computing device 104, 106, the message may indicate that responding via SMS is not available.

In various examples, data gathered by the context module 114 is fed to a context processing module 128. The context processing module 128 may use the data to determine or retrieve one or more contexts of the user. The context may be correlated with a message mode, which may be set by a context-aware message mode module 134. The correlations or user-based rules may be stored in a database 132.

In various examples, a message mode indicates the type of messages, format, communication channels, and from which contacts messages should be transmitted are to a secondary computing device. Types of messages may include, but are not limited to, voice calls, SMS messages, video calls, e-mails, and push notifications from applications. Formatting options may include, but are not limited to, truncation, keyword, subject matter, and full text. In various examples, the formatting of a message mode is set via the content to message mode selection module 136. Communication channels may indicate available modes of response communication to the message and may include Wi-Fi, Bluetooth®, cellular, and NFC and which secondary device to transmit the message.

A message mode may have various levels of granularity. For example, one message mode may indicate that only voice calls are to be transmitted to secondary computing device. Another message mode may indicate that only voice calls from certain contacts are to be transmitted. When a user has more than one secondary computing device, a message mode may indicate what types of messages are to be transmitted to a secondary computing device.

In various examples, a message mode may have different permutations for the different types of messages and contacts. For example, a message mode may indicate that voice calls for a top number (e.g., five, ten) of contacts should be transmitted to the secondary computing devices 104, 106, but SMS messages for all contacts are to be transmitted. The top contacts may be dynamically determined or set by a user using the primary computing device 102. For example, the context module 114 in conjunction with a continuous historical learning module 130 ("learning module" 130) may monitor a user's frequently interacted with contacts either by phone or through other applications such as SMS or social media applications.

In various examples, a message mode may include a suggested response for a message for transmitting to the secondary computing devices 104, 106. For example, a message mode may suggest pre-defined SMS responses based on past user responses or frequently used responses (e.g., "Yes," "No," "I'm busy."). Suggested responses do not need to be made using the same communication mode as the received message. For example, a voice call may be received, but an SMS message may be a suggested response channel. The use of short response messages may be beneficial when using a smaller device, such as a wrist-based device, due to the lack of a robust interface compared to a larger device.

In various examples, when a communication is received at the primary computing device 102, the message retrieval module 112 may determine based on the current context if the message is to be transmitted to one or more the secondary computing devices 104, 106. Upon determining that the message is to be transmitted, the message retrieval module 112 may format the message according to the current message mode and transmit it to the appropriate secondary computing device 104, 106.

In various examples, the secondary computing devices 104, 106 include respective communication buffers 138, 144 that store messages for display using display modules 140, 146, where such messages were received from the primary computing device 102. Response modules 142, 148 may be used to transmit response messages back to primary computing device 102, which then may be transmitted to various recipients via the network 108. Response modules 142, 148 may use suggested responses based on the context and correlated message mode on the primary computing device 102.

Figure 2:
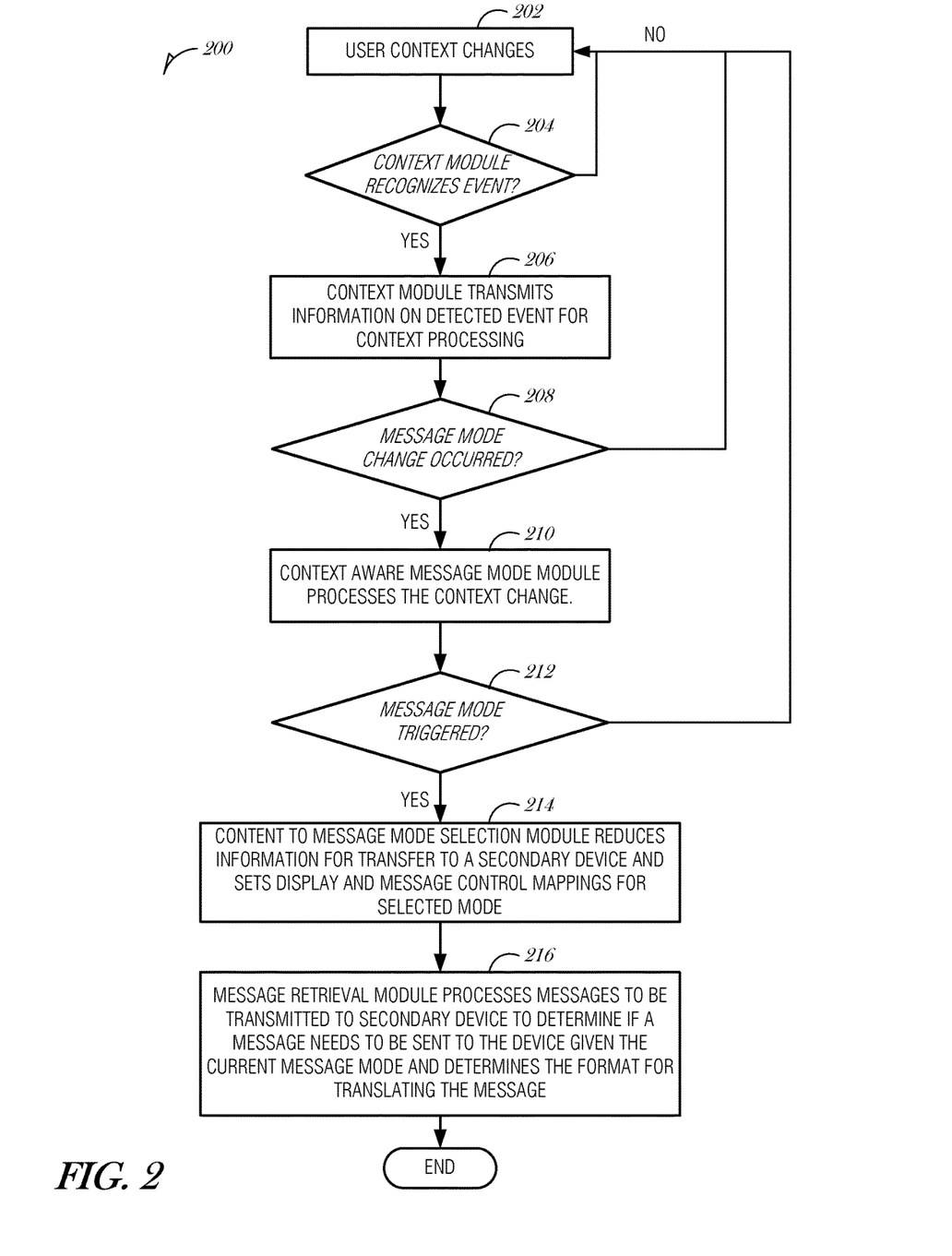
FIG. 2 is a flow chart illustrating a method to update a message mode, in accordance with an example embodiment.

FIG. 2 is a flow chart illustrating a method 200, in accordance with an example embodiment, of updating a message mode. The method 200 may be performed by any of the modules, logic, or components described herein In an example, at block 202 the user context changes. A user context change may include, but is not limited to a location change, a data/time change, proximity to others, an event (e.g., schedule), network connectivity, change in sound mode (e.g., vibrate), or application activity on the primary computing device 102.

In various examples at decision point 204, it is determined (e.g., via the context module 114) if the primary computing device 102 recognizes the user context change. For example, some changes may not be relevant to a message mode change and thus may be ignored. If this is true, then control flows back to block 202 for the next context change.

In various examples, if it is determined that the context change is relevant, the context module 114 may transmit the information on the context change to the context processing module 128 for further processing (block 206). In an example, at decision point 208 the context processing module 128 determines if a message mode change has occurred. As discussed above, the database 132 may store data on the various permutations of context factors and correlate these factors with a message mode. Thus, the context processing module 128 may access the database 132 to determine, in aggregate with the pre-existing factors, if the most recent context change results in a message mode change.

By way of example, consider that the user was in a meeting according to the user's calendar application, and that the context update is that the user is no longer in a meeting. The message mode for being in a meeting may have indicated that only calls from important contacts (e.g., top five contacts) should be transmitted for display on a secondary computing device. The context processing module 128 may next receive the context update that indicates the user is no longer in the meeting and, therefore, may no longer restrict the notifications to the important contacts.

In various examples, if it has been determined that a message mode change has occurred, then at block 210, the context aware message module 134 may processes the context change. A message mode may be updated with the context change if the context change indicates the current message mode is not optimal or incomplete. For example, the context change may be that during certain meetings the user frequently responds via e-mail and not SMS. Thus the message mode may be updated for a context based on meetings to not transmit a suggested SMS response. In an example, the context change is sent to the learning module 130 for further analysis of patterns of user behavior for possible updates to a message mode.

Once it has been determined that a modification to a message mode has been triggered (decision block 212), the content-to-message mode selection module 136 may implement the message mode to reduce the information for transfer to a secondary device (e.g., by type or message, contacts) and set the display and message control mappings for the selected mode at block 214. This may include retrieving a message mode from the database 132 or be set dynamically. The display and message control mappings may indicate the reductions in content for transmittal to a secondary device, according to various embodiments.

In various examples, at block 216, the message retrieval module 112 processes received communication messages to determine if a message needs to be sent to a secondary device according to the current message mode, and if so, determines the format for the translating the message into a form for transmittal to the secondary device.

Figure 3:
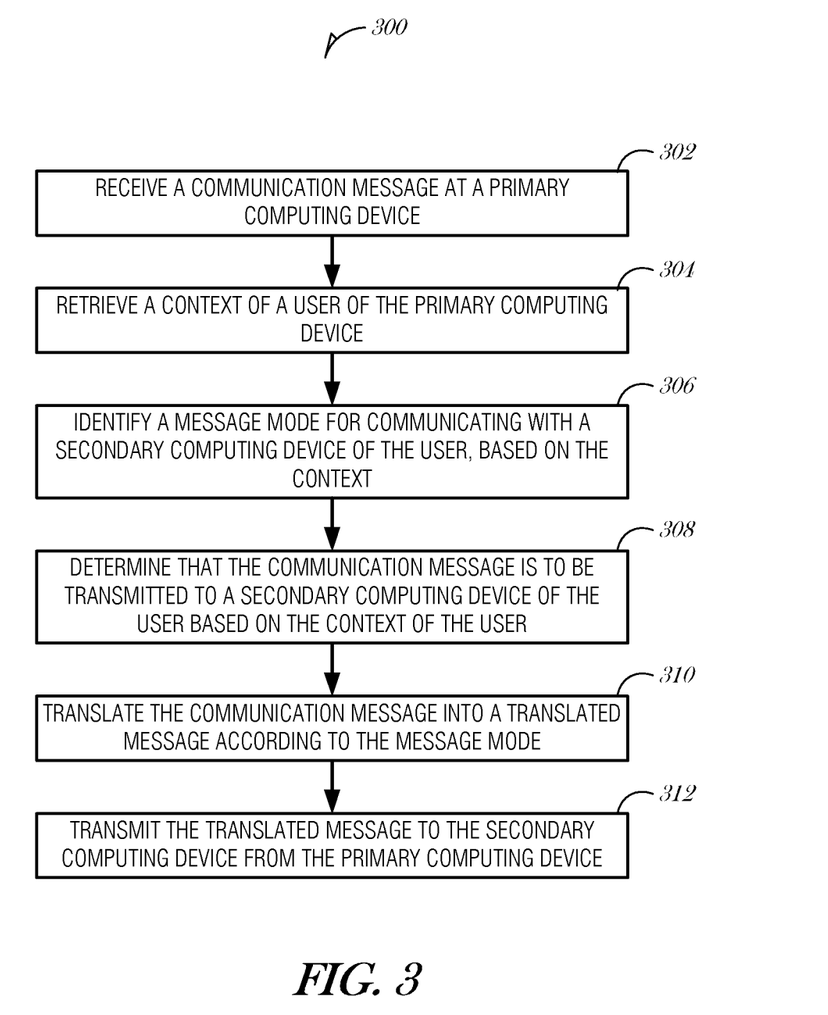
FIG. 3 is a flow chart illustrating a method to transmit a translated message to a secondary computing device, according to an example embodiment.

FIG. 3 is a flow chart illustrating a method 300, in accordance with an example embodiment, to transmit a translated message to a secondary computing device. The method 300 may be performed by any of the modules, logic, or components described herein.

In various examples, at block 302, a communication message is received at a primary computing device. For example, the communication message may be an e-mail, a voice call, an SMS, a voice call.

In various examples, at block 304, a context of a user of the primary computing device 102 is retrieved. For example, data collected by the context module 114 may be retrieved to infer a context of the user. The data may include location, data/time, proximity to others, a schedule of the user, and determined routines of a user. For example, the context may indicate the user is currently driving or is currently in a meeting at the user's office.

In various examples, at block 306, a message mode for communicating with a secondary computing device of the user, based on the context, is identified. A message mode may identify combinations of types of communication messages and contacts allowed for transmittal to a secondary computing device. For example, consider that the secondary computing device is a wearable wrist-based device. A message mode may allow restricted communications with a select few contacts which may be further restricted based upon the networking connectivity status (context). So, if there is currently no cellphone reception but a Wi-Fi network is available, the message mode may identify communication to/from the wrist-based device be restricted to the contacts that have a chat address (e.g., e-mail or other service available in the absence of a cellular connection) stored on the primary computing device as associated with the contact.

In various examples, a message mode may indicate the device best suited to respond to a message. For example, if a user's normal method for communicating with their spouse is to use quick one line responses such as "Yes, dear" or "No, dear", when a message is received from the user's spouse, the message may be directed to a wrist-based device where a quick touch or gesture may generate the response. Alternatively, if the message comes from the user's Mother, the primary computing device may vibrate as it would more than likely be the device the user will want to use to send a longer and more detailed response. In an example, the context continuous historical learning module 130 may analyze the user's behavior to detect patterns in how a user responds to various contacts. Thus, in various examples, the message mode may allow for the restriction of the set of users with which to communicate based upon the available communication channels and also selection of the secondary device based upon the user's style of communication with those contacts.

In various examples, at block 308, it is determined that the communication message is to be transmitted to a secondary computing device based on the accessed message mode and, at block 310, the communication message is translated into a translated message according to the message mode. In various examples, determining that the communication message is to be transmitted may include comparing the communication type and sender of the communication with the message mode. In various examples, there may be more than one secondary computing device and the message mode may indicate that different types of communication messages should be transmitted to different secondary computing devices.

By way of example, consider the context indicates the user may be in a meeting and the primary computing device is to remain in vibrate mode until the meeting is over. In this context, the secondary computing device may be used to quickly and discreetly communicate any critical messages that can be responded to via a "yes" or "no," or by choosing between two pre-configured responses. Thus, in various examples, the message mode may identify that e-mails that are high priority may be transmitted to the secondary computing device with an indication that the message is important, and allow the user to discreetly view the message to determine, and perhaps respond to the e-mail.

In various examples, the message mode indicates how different types of messages are to be translated. In an example, the translation preferences are set by a user on the primary computing device. The translation may include truncating the content of a message (e.g., only the first 200 characters) or reducing the message to keywords or a subject using natural language processing algorithms. For example, when the movement of a user indicates the user is running, a reduced SMS message may be the translated message.

Different message types may have different translation settings. In various examples, the content of the message is not transmitted, but instead is converted into haptic feedback or audio feedback that may be used on the secondary computing device. For example, the message mode may indicate that voice calls from a user's top five contacts are to be "played" as a series of pulses.

In various examples, at block 312, the translated message is transmitted from the primary computing device to the secondary computing device. Upon receiving the translated message, the secondary computing device may display or playback the translated message. A user may then interact with the message to select a response or responses using various input devices of the secondary computing device, which may include, but are not limited to, touch, button, gesture, or voice. Upon receiving user input on the secondary computing device, the selection or response made using the user input selection may be transmitted back to the primary computing device for further processing. For example, if the communication is an SMS message, the user may select one of the pre-defined SMS responses. The selection may be transmitted to the primary computing device which then transmits the SMS response via the network 108.

In various examples, the translated message includes recommended response options. The response options may be determined over time by analyzing past user activity with respect to various communication messages and contacts (e.g., using the context continuous historical learning module). Consider that the communication message is a phone call, and the recommended response options are to answer the call, reject the call and send immediately to voice mail, or silent ringing. The message retrieval module may also infer the most probable action given a context and past user behavior (e.g., silent ringing when the user is in a meeting).

Thus, in various examples, when the list of options is displayed on a secondary device, an indication may be presented with the most likely response or default response option highlighted (e.g., bolded, outlined). In an example, the user may select the default option with a wrist gesture using a bracelet/wrist-based device with gesture recognition capability. Consequently, with minimal effort the user may affirm the most likely response. The user may also reject the default response option and select (e.g., using a touchscreen) one of the other options such as answering the call in which case the secondary device may transit a message back to the primary computing device with instructions to answer the call.

Embodiments may be implemented in one or a combination of hardware, firmware, and software. Embodiments may also be implemented as instructions stored on a machine-readable storage device such as a machine-readable medium, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
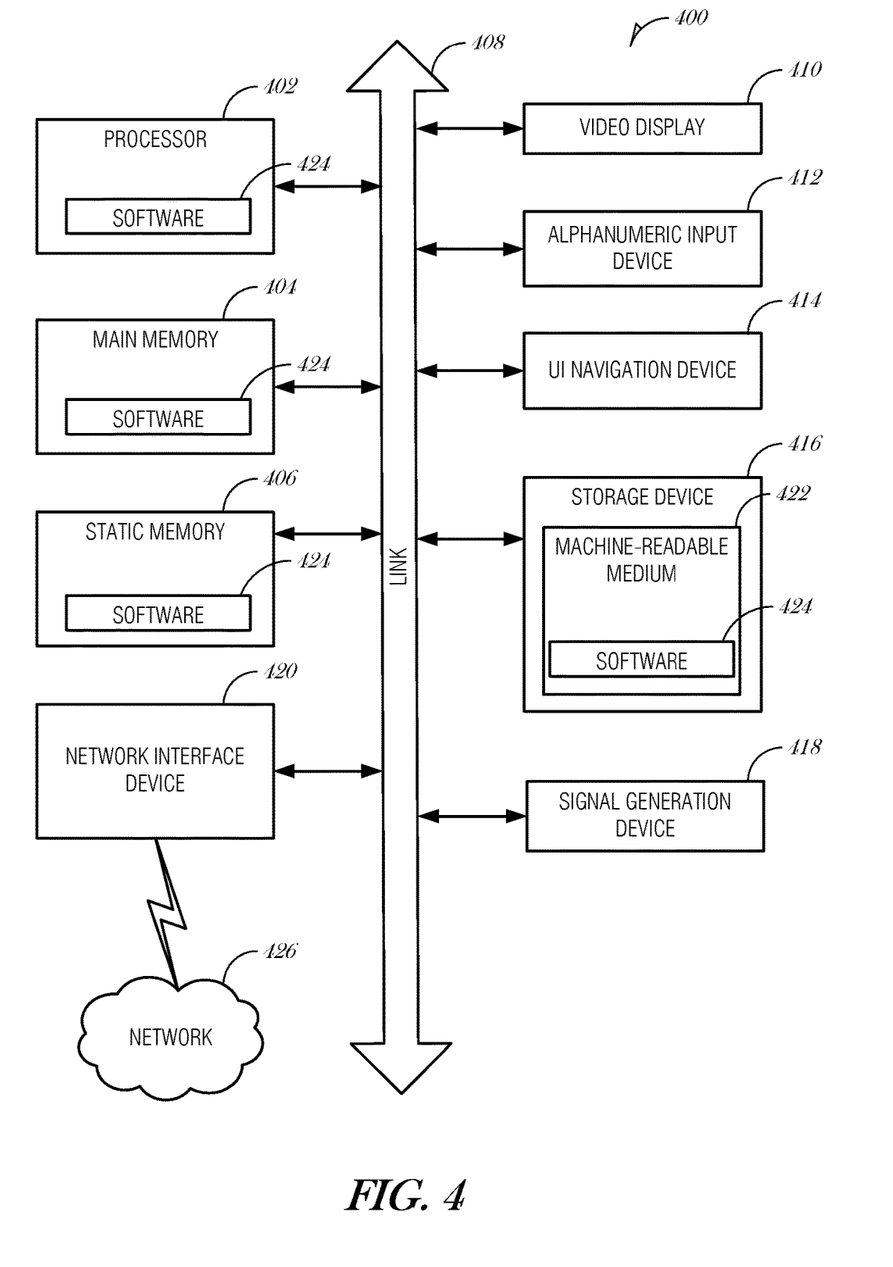
FIG. 4 is a block diagram of machine in the example form of a computer system within which a set instructions, for causing the machine to perform any one or more of the methodologies discussed herein, may be executed.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 includes subject matter (such as a device, apparatus, or machine) comprising a primary computing device to transmit a message to a secondary computing device, the primary computing device comprising: a context processing module to retrieve a context of a user of a primary computing device; a context-aware message mode module to identify a message mode for communicating with a secondary computing device of the user based on the context; and a message retrieval module to: receive a communication message at the primary computing device; determine that the communication message is to be transmitted to the secondary computing device of the user based on the message mode, and based on the determining: translate the communication message into a translated message according to the message mode; and transmit the translated message to the secondary computing device from the primary computing device.

In Example 2 the subject matter of Example 1 may optionally include, wherein the message retrieval module is to transmit a default response option, from the primary computing device to the secondary computing device, to respond to the communication message based on the context of the user.

In Example 3 the subject matter of any one or more of Examples 1 to 2 may optionally include, wherein the default response option is to reject a voice call when the context indicates that the user is in a meeting.

In Example 4 the subject matter of any one or more of Examples 1 to 3 may optionally include, wherein the communication message is an SMS message and the default response option is a predefined SMS response.

In Example 5, the subject matter of any one or more of Examples 1 to 4 may optionally include, wherein the context is based on a schedule of the user.

In Example 6 the subject matter of any one or more of Examples 1 to 5 may optionally include, wherein the context is based on available network connections to the primary computing device.

In Example 7 the subject matter of any one or more of Examples 1 to 6 may optionally include, wherein the context is based on movement of the user of the primary computing device.

In Example 8 the subject matter of any one or more of Examples 1 to 7 may optionally include, wherein the translated message is a reduced SMS message when the movement of the user indicates the user is running.

In Example 9 the subject matter of any one or more of Examples 1 to 8 may optionally include, wherein the message retrieval module is to determine that that the communication message is to be transmitted to the secondary computing device by comparing a type of communication message permitted for transmittal to the secondary computing device, according to the message mode, with the type of the received communication message.

In Example 10 the subject matter of any one or more of Examples 1 to 9 may optionally include, wherein the message retrieval module is to translate the communication message into the translated message by truncating content of the communication message.

In Example 11 the subject matter of any one or more of Examples 1 to 10 may optionally include, wherein the translated message is a truncated version of the communication message.

Example 12 includes or may optionally be combined with the subject matter of any one of Examples 1-11 to include subject matter for transmitting a message to a secondary computing device (such as a method, means for performing acts, machine readable medium including instructions that when performed by a machine cause the machine to performs acts, or an apparatus configured to perform) comprising receiving a communication message at a primary computing device; identifying a message mode for communicating with a secondary computing device of the user based on the context of a user of the primary computing device; and determining that the communication message is to be transmitted to the secondary computing device of the user based on the message mode, and based on the determining: translating the communication message into a translated message according to the message mode; and transmitting the translated message to the secondary computing device from the primary computing device.

In Example 13 the subject matter of Example 12 may optionally include, wherein determining that the communication message is to be transmitted comprises: comparing a type of communication message permitted for transmittal to the secondary computing device according to the message mode with the type of the received communication message.

In Example 14 the subject matter of any one or more of Examples 12 to 13 may optionally include, wherein translating the communication message into a translated message comprises: reducing content of the communication message into at least one keyword.

In Example 15 the subject matter of any one or more of Examples 12 to 14 may optionally include, wherein translating the communication message into a translated message comprises: truncating content of the communication message.

In Example 16 the subject matter of any one or more of Examples 12 to 15 may optionally include, wherein translating the communication message into a translated message comprises :translating the communication into haptic feedback.

In Example 17 the subject matter of any one or more of Examples 12 to 16 may optionally include, retrieving the context of the user of the primary computing device.

In Example 18 the subject matter of any one or more of Examples 12 to 17 may optionally include, wherein retrieving the context of a user of the primary computing device comprises determining that a cellular connection of the primary computing device is not available.

In Example 19 the subject matter of any one or more of Examples 12 to 18 may optionally include, wherein the identified message mode indicates that communication messages transmitted to the secondary computing device are restricted to contacts that which have a chat address.

In Example 20 the subject matter of any one or more of Examples 12 to 19 may optionally include, wherein retrieving the context of a user of the primary computing device comprises retrieving a schedule of the user and determining the user is in a meeting.

In Example 21 the subject matter of any one or more of Examples 12 to 20 may optionally include, wherein the identified message mode indicates that communication messages transmitted to the secondary computing device are restricted to a set number of contacts.

In Example 22 the subject matter of any one or more of Examples 12 to 21 may optionally include, reducing content of the communication message when the context of the user indicates the user is running.

In Example 23 the subject matter of any one or more of Examples 12 to 22 may optionally include, transmitting a default response option, from the primary computing device to the secondary computing device, to respond to the communication message based on the context of the user.

Example 23 includes or may optionally be combined with the subject matter of any one of Examples 1-23 to include a machine-readable medium including instructions for transmitting a message to a secondary computing device, which when executed by a machine, cause the machine to perform operations of any one of the examples 1-23.

Example 24 includes or may optionally be combined with the subject matter of any one of Examples 1-23 to include an apparatus comprising means for performing any of the Examples 1-23.

Example 25 includes an apparatus instructions for transmitting a message to a secondary computing device, the apparatus comprising: means for identifying a message mode for communicating with a secondary computing device of the user based on the context of a user of the primary computing device; and means for determining that the communication message is to be transmitted to the secondary computing device of the user based on the message mode, and based on the determining: means for translating the communication message into a translated message according to the message mode; and means for transmitting the translated message to the secondary computing device from the primary computing device The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A non-transitory machine-readable medium including instructions for transmitting a message to a secondary computing device, which when executed by a machine, cause the machine to perform operations comprising:
    receiving a communication message at a primary computing device of a user;
    transmitting a default response option, from the primary computing device to the secondary computing device, to respond to the communication message based on a context of the user, the context of the user determined by using a sensor included in the primary computing device;
    identifying a message mode for communicating with a secondary computing device of the user based on a context of the user determined by using a sensor included in the primary computing device; and determining that the communication message is to be transmitted to the secondary computing device of the user based on the message mode, and based on the determining:
translating the communication message into a translated message according to the message mode, the translating comprising truncating content of the communication message; and
transmitting the translated message to the secondary computing device from the primary computing device.

2. The machine-readable medium of claim 1, wherein determining that the communication message is to be transmitted comprises:
comparing a type of communication message permitted for transmittal to the secondary computing device, according to the message mode, with the type of the received communication message.

3. The machine-readable medium of claim 1, wherein translating the communication message into the translated message comprises:
reducing content of the communication message into at least one keyword.

4. The machine-readable medium of claim 1, wherein translating the communication message into the translated message comprises:
translating the communication message into haptic feedback.

5. The machine-readable medium of claim 1, further comprising retrieving the context of the user of the primary computing device.

6. The machine-readable medium of claim 5, wherein retrieving the context of the user of the primary computing device comprises determining that a cellular connection of the primary computing device is not available.

7. The machine-readable medium of claim 6, wherein the identified message mode indicates that communication messages transmitted to the secondary computing device are restricted to contacts that have a chat address.

8. A primary computing device for transmission of a message to a secondary computing device, the primary computing device comprising:
a processor; and
a memory coupled to the processor, the memory comprising instructions which, when executed by the processor, cause the primary computing device to:
determine a context of a user of the primary computing device by using a sensor included in the primary computing device;
identify a message mode for communicating with a secondary computing device of the user based on the context;
receive a communication message at the primary computing device;
transmit a default response option, from the primary computing device to secondary computing device, to respond to the communication message based on the context of the user; and
determine that the communication message is to be transmitted to the secondary computing device of the user based on the message mode, and based on the determining:
translate the communication message into a translated message according to the message mode, the translating comprising truncating content of the communication message; and
transmit the translated message to the secondary computing device from the primary computing device.

9. The primary computing device of claim 8, wherein the default response option is to reject a voice call when the context is that the user is in a meeting.

10. The primary computing device of claim 8, wherein the communication message is an SMS message and the default response option is a predefined SMS response.

11. The primary computing device of claim 8, wherein the context is based on a schedule of the user.

12. The primary computing device of claim 8, wherein the context is based on available network connections to the primary computing device.

13. The primary computing device of claim 8, wherein the context is based on movement of the user of the primary computing device.

14. The primary computing device of claim 13, wherein the translated message is a reduced SMS message when the movement of the user indicates the user is running.

15. The primary computing device of claim 8, the memory further comprising instructions which, when executed by the processor, cause the primary computing device to: determine that that the communication message is to be transmitted by comparing a type of communication message permitted for transmittal to the secondary computing device, according to the message mode, with a type of the received communication message.

16. The primary computing device of claim 8, the memory further comprising instructions which, when executed by the processor, cause the primary computing device to: translate the communication message into the translated message by truncating content of the communication message.

17. The primary computing device of claim 8, wherein the translated message is a truncated version of the communication message.

18. A method for transmitting a message to a secondary computing device, the method comprising:
receiving a communication message at a primary computing device of a user;
transmitting a default response option, from the primary computing device to the secondary computing device, to respond to the communication message based on a context of the user, the context of the user determined by using a sensor included in the primary computing device;
identifying a message mode for communicating with a secondary computing device of the user based on a context of the user determined by using a sensor included in the primary computing device the primary computing device; and
determining that the communication message is to be transmitted to the secondary computing device of the user based on the message mode, and based on the determining:
translating the communication message into a translated message according to the message mode, the translating comprising truncating content of the communication message; and
transmitting the translated e, sage to the secondary computing device from the primary computing device.

19. The method of claim 18, wherein determining that the communication message is to be transmitted comprises:
comparing a type of communication message permitted for transmittal to the secondary computing device, according to the message mode, with a type of the received communication message.

20. The method of claim 18, wherein translating the communication message into a translated message comprises:
reducing content of the communication message into at least one keyword.

21. A primary computing device for transmitting a message to a secondary computing device, the primary computing device comprising:
means for receiving a communication message at the primary computing device;
means for transmitting a default response option, from the primary computing device to the secondary computing device, to respond to the communication message based on a context of the user, the context of the user determined by using a sensor included in the primary computing device;
means for identifying a message mode for communicating with a secondary computing device of the user based on a context of the user determined by using a sensor included in the primary computing device the primary computing device; and
means for determining that the communication message is to be transmitted to the secondary computing device of the user based on the message mode, and based on the determining:
means for translating the communication message into a translated message according to the message mode, the translating comprising truncating content of the communication message; and
means for transmitting the translated message to the secondary computing device from the primary computing device.

22. The primary computing device of claim 21, wherein the means for translating the communication message into a translated message comprises means for reducing content of the communication message into at least one keyword.

* * * * *

UNITED STATES PATENT AND TRADEMARK OFFICE
CERTIFICATE OF CORRECTION

PATENT NO. : 9,912,775 B2  
APPLICATION NO. : 14/367964  
DATED : March 6, 2018  
INVENTOR(S) : Durham et al.

Page 1 of 1

It is certified that error appears in the above-identified patent and that said Letters Patent is hereby corrected as shown below:

In the Claims

In Column 14, Line 25, in Claim 15, delete "that that" and insert --that-- therefor In Column 14, Line 61, in Claim 18, delete "e, sage" and insert --message-- therefor Signed and Sealed this  
Fourth Day of June, 2019

Andrei Iancu  
*Director of the United States Patent and Trademark Office*